United States Patent [19]

Conover et al.

[11] 4,288,564
[45] Sep. 8, 1981

[54] PROCESS FOR THE PRODUCTION OF MICROCELLULAR ELASTOMERIC MOLDINGS AND THE RESULTANT PRODUCTS

[75] Inventors: Steven M. Conover, Pittsburgh; Robert M. Loring; William A. Ludwico, both of Library, all of Pa.; John W. Arnold, West Bloomfield; George Ferber, Sterling Heights, both of Mich.

[73] Assignees: Mobay Chemical Corporation, Pittsburgh, Pa.; General Motors Corporation, Detroit, Mich.

[21] Appl. No.: 52,877

[22] Filed: Jun. 28, 1979

Related U.S. Application Data

[63] Continuation of Ser. No. 895,336, Apr. 11, 1978, abandoned.

[51] Int. Cl.³ .............................................. B29D 27/00
[52] U.S. Cl. .................... 521/122; 264/45.3; 264/50; 264/DIG. 5; 264/DIG. 13; 264/DIG. 83; 521/99; 521/123; 521/133; 521/163
[58] Field of Search ............... 264/51, DIG. 17, 45.3, 264/50, DIG. 83, DIG. 13, DIG. 5; 521/99, 122, 123, 133, 163

[56] References Cited

U.S. PATENT DOCUMENTS

| | | | |
|---|---|---|---|
| 3,256,218 | 6/1966 | Knox | 264/DIG. 17 |
| 3,640,290 | 2/1972 | Cear | |
| 3,865,758 | 2/1975 | Yoshida et al. | 521/99 X |
| 4,048,105 | 9/1977 | Salisbury | 521/163 X |
| 4,067,831 | 1/1978 | Wasilczyk | 521/122 X |
| 4,108,791 | 8/1978 | Wasilczyk | 521/99 X |

FOREIGN PATENT DOCUMENTS

2119722 11/1972 Fed. Rep. of Germany .
1543258 11/1978 United Kingdom .

*Primary Examiner*—Philip Anderson
*Attorney, Agent, or Firm*—Gene Harsh; Joseph C. Gil

[57] ABSTRACT

The instant invention is directed to a process for the production of microcellular elastomeric moldings comprising:
(A) introducing a reaction mixture into a closed mold, said reaction mixture comprising:
  (i) an organic polyisocyanate,
  (ii) a hydroxyl group containing compound having a molecular weight of from 1800 to 12,000,
  (iii) a catalyst for the reaction between hydroxyl groups and isocyanate groups,
  (iv) an active aromatic diamine having at least one alkyl substituent in the orthoposition to a first amino group and two alkyl substituents in orthoposition to a second group, and
  (v) air and/or nitrogen dissolved under pressure in any one or more of Components (i), (ii), (iii) or (iv),
(B) allowing said reaction mixture to react in said mold and
(C) removing the resultant product from said mold, the improvement wherein in any of Components (i), (ii), (iii) or (iv) which does contain said air and/or nitrogen dissolved therein there is included an inorganic, finely divided, nitrogen adsorbing agent in an amount sufficient to accelerate the transition of the air and/or nitrogen from the dissolved state to the dispersed state upon release of the pressure (i.e., as the liquid reacting mixture flows into the mold). It is this dispersed state which allows for adequate blowing during the process.

13 Claims, No Drawings

PROCESS FOR THE PRODUCTION OF MICROCELLULAR ELASTOMERIC MOLDINGS AND THE RESULTANT PRODUCTS

This is a continuation of application Ser. No. 895,336 filed Apr. 11, 1978, now abandoned.

BACKGROUND OF THE INVENTION

In recent years, there has been much interest in producing a variety of different molded parts by the so-called "reaction injection molding" (RIM) process. This process involves a technique of filling a closed mold with highly reactive, liquid starting components within a very short time, generally by using high output, high pressure dosing apparatus after the components have been mixed in so-called "positively controlled" mixheads.

The RIM process is widely known and a detailed description of the technology thereof may be found, for example, in the following references:

Piechota/Rohr: "Integralschaumstoffe", Carl Hanser-Verlag, Munich/Vienna, 1975;

Prepelka/Wharton: "Reaction Injection Molding in the Automotive Industry", Journal of Cell. Plastics, Vol. II, Nov. 2, 1975

Knipp: "Plastics for Automobile Safety Bumpers", Journal of Cell. Plastics, Nov. 2, 1973.

Ludwico/Taylor: "The Bayflex 110 Systems—The New Generation of RIM Materials", presented at SAE Passenger Car MTG, Detroit, September 1977.

The reaction injection molding technique may be used for producing large moldings weighing from 3 to 10 kg or more, such as the flexible car body parts also known in the motor industry as "soft face elements", i.e. reversibly shaped front and rear parts of motor vehicles.

The following technical advance is generally achieved by the RIM procedure: large quantities of liquid, highly reactive starting materials are delivered mechanically within a very short time (from about 2 to 4 seconds), are mixed, and are introduced into a closed mold in which the mixture is cured to yield the finished product within a time (from 30 to 120 seconds) which is also very short for polyurethane materials.

Realization of this technology required a solution to the following three problems:

1. In view of the high reactivity of the starting components (polyisocyanates and compounds which are reactive with polyisocyanates) the reaction mixture must be introduced into the mold within the shortest possible time which should not exceed the cream time (i.e., the time between mixing of the reactants and the first visible signs of a chemical reaction). This necessitated the development of highly efficient axial and radial piston pumps which when installed in high pressure machines were capable of delivering at a rate of from 2.5 to 6.5 kg/second. Machines of this type are known and have been described, for example, in German Offenlegungsschriften Nos. 1,778,060 and 2,146,054.

2. Production of a faultless molding required not only exact dosing of the components to keep them at a particular ratio prescribed by the given formulation over the whole period of injection, but also required intimate mixing of the components from the first to last drop. Perfect mixing is made enormously difficult by the fact that due to their high flow velocities, the components have only a very short residence time in the mixing chamber of the mixing head. This problem could be solved by using so-called positively controlled "mixheads" which operate on the principle of counterflow injection (see e.g., U.S. Pat. Nos. 3,709,640 and 3,857,550, and German Offenlegungsschriften Nos. 2,007,935 and 2,364,501).

3. When the reaction mixture enters the closed mold, it almost instantly displaces the air contained in the mold. To ensure that this does not lead to inclusions of air in the reaction mixture and hence faults in the end product, the liquid streaming into the mold must, in effect, "push" the air forward in front of it in the form of a "flow front" and expel it through predetermined slots. To ensure complete absence of turbulence during filling of the mold, the material must enter the mold over a wide front along the wall of the mold in a laminar stream. This has been achieved by developing a certain technique of injection through so-called "film gates" described in German Offenlegungscchriften Nos. 2,348,658 and 2,348,608.

In spite of the many advantages of the RIM process, there is a continual searching for faster reactive systems, particularly for use in mass production industries, such as the automotive industry.

A very promising reactive system has recently been developed which is based on the use of an active aromatic diamine having at least one alkyl substituent in the ortho-position to a first amino group and two alkyl substituents in ortho-position to a second amino group. These active aromatic diamines are generally used in combination with organic polyisocyanates, hydroxyl group-containing materials and catalysts for the reaction between hydroxyl groups and isocyanate groups. These systems are the subject of U.S. Application Ser. No. 894,227 filed Apr. 7, 1978 now abandoned, a continuation of CIP Application Ser. No. 803,014 filed June 24, 1977, now abandoned which was in turn a continuation of Application U.S. Ser. No. 761,166 filed Jan. 21, 1977, now abandoned.

These active systems gel so quickly upon mixing of the components that the final products produced therefrom have relatively high densities (i.e., 70 lbs. per cubic ft.), since conventional organic blowing agents do not volatilize quickly enough to have any blowing effect. Consequently, the molds used are generally overpacked in order to ensure adequate filling of the mold. This overpacking necessarily results in (a) an increase in the pressure in the mold requiring increased clamping pressures to keep the mold closed and (b) visual surface defects. While the surface defects are not physical (i.e., they do not affect the surface physically and do not appear to affect the physical properties), their visual appearance renders them unacceptable for use in a variety of different applications, particularly for exposed automotive parts.

It would be desirable to reduce the density of the products of the above-noted reactive systems (e.g., to about 60 lbs. per cubic foot), while at the same time reducing the internal mold pressure and eliminating the surface defects.

Since conventional organic blowing agents are ineffective, one suggestion, which has met with some success, has been to include in one or more of the components air and/or nitrogen under pressure. The use of air and/or nitrogen in polyurethane systems is, of course, known, as are the many and varied techniques for providing such dissolved air and/or nitrogen. For example, air and/or nitrogen has been introduced directly into the mixing chamber and mixed simultaneously with the reactive mixture. Additionally, the air and/or nitrogen has been whipped into one or more of the components. The creamy mixture formed is then metered by means of a pump to a final mixing chamber where it is mixed with the other reactive components. When the metering pump discharges at a sufficiently high pressure, the quantity of gas which is initially dissolved and/or dispersed in the starting material, which is fed to the metering pump, dissolves at the higher pressure in a very short period of time. The liquid fed to the mixhead then contains gas in the dissolved state. Upon being fed to the mixhead, dissolution takes place in a very short time. In general, it is preferred that the gas be dissolved in one or more of the components. Other techniques for dissolving gases are also known and are described in e.g. U.S. Application Ser. Nos. 712,457, now abandoned, and 724,132 and now U.S. Pat. No. 4,089,206 filed on Aug. 6, 1976 and Sept. 17, 1976, respectively and in U.S. Pat. No. 4,050,896.

Although the use of such dissolved air and/or nitrogen has met with some success with the highly active systems noted above, it has been found that the resultant molded part, while of reduced density (e.g., from 62 to 68 lbs. per cubic ft.), will have varied densities throughout the molded part.

As noted above, air and/or nitrogen is effectively dissolved under pressure in one or more of the components. It has been observed that when this pressure is relieved (e.g., upon passage of the components through the mixhead and into the mold), the air and/or nitrogen does not immediately pass from the dissolved state to the dispersed state. It is believed that a state of super saturation exists in liquid reacting system containing the dissolved gas for some finite period of time. For these highly reactive systems, this delay in passage from the dissolved to the dispersed state is sufficiently long so that gelation occurs in the mold before proper blowing.

All of the above-noted problems have now been substantially removed by the instant invention.

DESCRIPTION OF THE INVENTION

The instant invention is directed to a process for the production of microcellular elastomeric moldings comprising:
(A) introducing a reaction mixture into a closed mold, said reaction mixture comprising:
 (i) an organic polyisocyanate,
 (ii) a hydroxyl group containing compound having a molecular weight of from 1800 to 12,000,
 (iii) a catalyst for the reaction between hydroxyl groups and isocyanate groups,
 (iv) an active aromatic diamine having at least one alkyl substituent in the ortho-position to a first amino group and two alkyl substituents in ortho-position to a second group, and
 (v) air and/or nitrogen dissolved under pressure in any one or more of Components (i), (ii), (iii) or (iv),
(B) allowing said reaction mixture to react in said mold and
(C) removing the resultant product from said mold, the improvement wherein in any of Components (i), (ii), (iii) or (iv) which does contain said air and/or nitrogen dissolved therein there is included an inorganic, finely divided, nitrogen adsorbing agent in an amount sufficient to accelerate the transition of the air and/or nitrogen from the dissolved state to the dispersed state upon release of the pressure.

It has been found that the use of the above-noted inorganic, finely divided, nitrogen adsorbing agents (i) significantly enhance the blowing action of the air and/or nitrogen, (ii) provide for uniform density of the molded part, (iii) allow for the reduction of internal mold pressures, and (iv) substantially eliminate surface defects. These effects are obtained due to the ability of the nitrogen adsorbing agents to accelerate the transition of the air and/or nitrogen from the dissolved state to the dispersed state when the pressure is relieved.

The nitrogen adsorbing agents useful in the instant invention are known, and are described in Kirk-Othmer, "Encyclopedia of Chemical Technology", Second Edition, completely revised, Volume 1, page 460, and Perry, "Chemical Engineers' Handbook", Fifth Edition, pages 16-5 and 16-6, the disclosures of both of which are herein incorporated by reference. Specific useful nitrogen adsorbing agents include aluminas such as activated alumina, and activated bauxite; siliceous adsorbents such as zeolite, aluminosilicates, acid-treated clays, magnesia-silica gel, and Fuller's earth, silica gel; carbons such as activated carbon and carbon black; iron oxides; and the like. Presently preferred are activated carbons and iron oxides. In general, the only requirement for useful adsorbing agents are that they have a relatively large surface area, generally in excess of 10 $m^2/g$, and that they do not adversely affect the physical properties of the final product. In general also, less abrasive materials are more desirable in order to avoid undue wear on some high pressure metering pumps.

In general, the amount of nitrogen adsorbing agent used must be sufficient to substantially enhance the blowing efficiency of the system when the air and/or nitrogen is dissolved in one or more of the components under pressure. Thus, the minimal amount necessary can be characterized in two ways: (a) as an amount sufficient to reduce the amount of gas which must be dissolved in the system to achieve a part having a given specific gravity, or (b) as an amount which at the same gas loading (i.e., dissolved gas) will allow for the production of a final product having a lower specific gravity than when no adsorbing agent is used. In general, the amount added will range from 0.01 to 1% by weight based on the amount of hydroxyl group containing material. It is preferred, however, that the amount used be from 0.1 to 0.7% by weight, and will most preferably be about 0.5% by weight. In use, the adsorbing agent is merely added to the component or components in which it is desired to dissolve the air and/or nitrogen. The air and/or nitrogen is then dissolved using art recognized techniques.

The polyisocyanates used as starting components according to the present invention may be aliphatic, cycloaliphatic, araliphatic, aromatic or heterocyclic polyisocyanates (for purposes of the instant invention, the term "polyisocyanate" is intended to include any isocyanate having two or more isocyanate groups) such as those described, for example, by W. Siefken in Justus Liebigs Annalen der Chemie, 562, pages 75 to 136. Specific examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (German Auslegeschrift No. 1,202,785 and U.S. Pat. No. 3,401,190); hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or -4,4'-diisocyanate; phenylene-1,3-diisocyanate and 1,4-diisocyanate; tolylene-2,4-diisocyanate and -2,6-diisocyanate and mixtures of these isomers; diphenylmethane-2,4'-diisocyanate and/or -4,4'-diisocyanate; naphthylene-1,5-diisocyanate, triphenylmethane-4,4',4''-triisocyanate; polyphenyl-polymethylene polyisocyanates which may be obtained by aniline-formaldehyde condensation followed by phosgenation and which have been described, for example, in British Pat. Nos. 874,430 and 848,671; m- and p-isocyanatophenyl-sulphonyl isocyanates as described in U.S. Pat. No. 3,454,606; perchlorinated aryl polyisocyanates, such as those described in U.S. Pat. No. 3,277,138; polyisocyanates having carbodiimide groups as described in U.S. Pat. No. 3,152,162; diisocyanates of the type described in U.S. Pat. No. 3,492,330; polyisocyanates containing allophanate groups as described, e.g. in British Pat. No. 994,890, in Belgian Pat. No. 761,626 and in published Dutch Patent Application No. 7,102,524; polyisocyanates containing isocyanurate groups as described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described in Belgian Pat. No. 752,261 and U.S. Pat. No. 3,394,164; polyisocyanates containing acylated urea groups as described in German Pat. No. 1,230,778; polyisocyanates containing biuret groups as described in U.S. Pat. Nos. 3,124,605 and 3,201,372 and in British Pat. No. 889,050; polyisocyanates prepared by telomerization reactions as described, for example, in U.S. Pat. No. 3,654,106; polyisocyanates having ester groups, such as those mentioned, for example, in British Pat. Nos. 965,474 and 1,072,956, U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid groups as described in U.S. Pat. No. 3,455,883.

Particularly suitable for the process according to the present invention are diisocyanates or polyisocyanates based on 4,4'-diisocyanatodiphenylmethane. Pure 4,4'-diisocyanatodiphenylmethane (m. p. approx. 40° C.) may also be used according to the present invention.

The presently preferred starting components (a) are liquid polyisocyanates having urethane groups, which may be obtained (e.g. as described in German Offenlegungsschrift No. 1,618,380) by reacting 1 mol of 4,4'-diisocyanatodiphenylmethane with from 0.05 to 0.3 mols of low molecular weight diols or triols, preferably with polypropylene glycols having a molecular weight below 700, or diisocyanates having carbodiimide and/or uretoneimine groups based on diphenylmethane diisocyanate, which are obtainable according to U.S. Pat. No. 3,152,162. Mixtures of the last-mentioned preferred polyisocyanates are also highly useful. Aliphatic and cycloaliphatic isocyanates are generally less suitable for the purpose of the present invention.

The compounds used as Component (ii) in the process according to the present invention are preferably polyhydroxy materials having molecular weights of from 1800 to 12,000, and most preferably from 3000 to 7000. Polyethers are suitable for the process of the present invention. Preferred are those having at least 2, and preferably 2 or 3 hydroxyl groups are known and may be prepared, e.g. by polymerization of epoxides, such as ethylene oxide, propylene oxide, butylene oxide, tetrahydrofuran, styrene oxide or epichlorohydrin, either on their own, e.g. in the presence of $BF_3$, or by a process of chemical addition of these epoxides, optionally as mixtures or successively, to starting components having reactive hydrogen atoms, such as water, ammonia, alcohols, or amines. Examples of suitable starting components include ethylene glycol, propylene glycol-(1,3) or -(1,2), trimethylolpropane, 4,4'-dihydroxy-diphenylpropane, aniline, ethanolamine or ethylene diamine. Sucrose polyethers which have been described in German Auslegeschriften Nos. 1,176,358 and 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the presence of polyethers (U.S. Pat. Nos. 3,383,351; 3,304,273; 3,523,093 and 3,110,695; and German Pat. No. 1,152,536). Polybutadienes having OH groups may also be used.

According to the present invention, however, there may also be used polyhydroxyl compounds which contain high molecular weight polyadducts or polycondensates in a finely dispersed form or in solution. Such modified polyhydroxyl compounds are obtained when polyaddition reactions (e.g. reactions between polyisocyanates and amino functional compounds) or polycondensation reactions (e.g. between formaldehyde and phenols and/or amines) are directly carried out in situ in the above-mentioned hydroxyl compounds. Processes for the production of this type of material have been described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

According to the present invention, hydroxyl-containing polyesters, polythioethers, polyacetals, polycarbonates or polyester amides of the type known for the production of both homogeneous and cellular polyurethanes may also be used instead of or together with polyether polyols.

Suitable polyesters containing hydroxyl groups include, reaction products of polyhydric, (preferably dihydric alcohols), optionally with the addition of trihydric, alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio-mixed ethers, polythio-ether esters or polythio-ether ester amides, depending on the co-components.

Suitable polyacetals include, for example, the compounds which may be prepared from glycols, such as diethylene glycol, triethylene glycol, 4,4'-dioxethoxydiphenyl dimethylmethane and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, on pages 45 to 71.

In the process according to the present invention, Component (ii) preferably consists solely of the classical polyether polyols of polyurethane chemistry having molecular weights of from 1800 to 12,000, preferably from 3000 to 7000, and containing two or more preferably three hydroxyl groups. Mixtures of polyethers having two or three hydroxyl groups are preferred.

The active aromatic diamines, are preferably liquid or dissolved in or blended with the polyol component. By "active" diamines are meant those whose reactivity towards isocyanates has not been reduced by electron attracting substituents, such as halogen, ester, ether or disulphide groups, as is the case, for example, with methylene-bischloraniline (Moca). Also excluded from the term "active" are amines which contain other functional groups reactive with isocyanates. The active diamine is generally used in the process according to the present invention in quantities of from 5 to 75% by weight, preferably from 5 to 35% by weight, and most preferably from 8 to 35% by weight, based on Component (ii).

Liquid or dissolved aromatic amines which have proved to be particularly suitable for the process according to the present invention are those which contain at least one alkyl substituent in the ortho-position to a first amino group and two alkyl substituents in the ortho-position to a second amino group. Examples include: 1,3-diethyl-2,4-diamino-benzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and the like. The above-mentioned active aromatic amines may, of course, be used as mixtures with each other or in combination with other active aromatic amines.

It is generally preferred to use aromatic diamines which have an alkyl substituent (preferably of from 1 to 4 carbon atoms) in both ortho-positions to each amino group. For processing by the RIM process, it is generally preferred that the diamine be liquid at room temperature and miscible with the polyhydroxyl compounds in any proportion, particularly with polyhydroxypolyethers. Particularly preferred in this connection is the compound 1-methyl-3,5-diethyl-2,4-diaminobenzene or a mixture of this compound with 1-methyl-3,5-diethyl-2,6-diaminobenzene.

Catalysts (iii), which are also essential to the present invention and without which it is not possible to obtain a molding which sets rapidly in the mold and has technologically interesting mechanical properties, are preferably selected from the group of organic metal compounds known for use in polyurethane chemistry. According to the present invention, it is preferred to use organic tin compounds such as tin (II) salts of carboxylic acids, (such as tin (II) acetate, tin (II) octoate, tin (II) ethyl hexoate or tin (II) laurate), and the dialkyl tin salts of carboxylic acids, (such as dibutyl tin diacetate, dibutyl tin dilaurate, dibutyl tin maleate or dioctyl tin diacetate), either alone or most preferably as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines. Synergistically acting catalyst combinations of this type are known and have been described, for example, in German Offenlegungsschriften Nos. 2,434,185; 2,601,082 and 2,603,834.

Other catalysts which may be used include: known tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylamino-ethyl)adipate, N,N-diethylbenzylamine, pentamethyl-diethylenetriamine, N,N-dimethylcyclohexylamine, N,N,N',N'-tetramethyl-1,3-butanediamine, N,N-dimethyl-β-phenylethylamine, 1,2- dimethylimidazole and 2-methylimidazole. A preferred catalyst of this type is 1,4-diaza-bicyclo-(2,2,2)-octane.

Tertiary amines having isocyanate-reactive hydrogen atoms include, e.g. triethanolamine, triisopropanolamine, N-methyl-diethanolamine, N-ethyl-diethanolamine and N,N-dimethyl-ethanolamine may also be used. Reaction products of these compounds with alkylene oxides, such as propylene oxide and/or ethylene oxide are also suitable.

Silaamines having carbon-silicon bonds as described, e.g. in German Pat. No. 1,229,290 may also be used as catalysts. Examples include 2,2,4-trimethyl-2-silamorpholine or 1,3-diethylaminomethyl-tetramethyl-disiloxane.

Basic nitrogen compounds, such as tetralkylammonium hydroxides, alkali metal hydroxides such as sodium hydroxide, alkali metal phenolates, such as sodium phenolate, and alkali metal alcoholates, such as sodium methylate, may also be used as catalysts. Hexahydrotriazines are also suitable catalyst.

The above-mentioned catalysts may be used alone, (e.g. most preferably 1,4-diaza-bicyclo-(2,2,2)-octane,) or in combination with organic metal compounds, and in particular the organic tin compounds noted above.

Other representatives of catalysts which may be used according to the present invention and details concerning the action of the catalysts may be found, e.g., in Kunststoff-Handbuch, Volume VII, published by Vieweg and Hochtlen, Carl-Hanser-Verlag, Munich 1966, pages 96 to 102.

The catalysts are generally used in a quantity of from about 0.01 to 10% by weight, and preferably from 0.05 to 1% by weight, based on the quantity of Compounds (ii).

Air and/or nitrogen is also necessary and is introduced into one or more of the components using techniques known in the art. It is presently preferred to use commercial techniques such as Diffuser Stone-KIMEX mixers and venturi type mixers of the type described in U.S. application Ser. No. 725,600, filed Sept. 22, 1976.

Enough gas is customarily put into the system in an amount in excess of the amount necessary to saturate the particular component at a feed tank pressure of from 30 to 50 psi. As is known in the art, material flows from the feed tank through a transfer pump (which increases the pressure of the particular component) through a metering pump to the mixhead. Discharge pressures of the transfer pump are generally in the range of 50 to 100 psi, while discharge pressures of the metering pump are generally in the range of 2000 to 3000 psi. The amount of the gas in the system is generally monitored using commercial measuring equipment which responds to changes in specific gravity of the liquid components. One such device is the Dynatrol (Mfg. by Automation Products). This device permits the effective control of the gas content by monitoring any changes in the specific gravity of the liquid component.

Surface-active additives (emulsifiers and foam stabilizers) may also be used according to the present invention. Suitable emulsifiers include the sodium salts of ricinoleic sulphonates or of fatty acids, or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The most useful foam stabilizers are primarily water-soluble polyether siloxanes. These compounds generally have a polydimethylsiloxane group attached to a copolymer of ethylene oxide and propylene oxide. Foam stabilizers of this type are known and have been described, for example, in U.S. Patent 2,764,565.

Known cell regulators, such as paraffins or fatty alcohols or dimethylpolysiloxanes, pigments, dyes, flame retarding agents, such as bis-chloroethylphosphate or ammonium phosphate and polyphosphate, stabilizers against ageing and weathering, plasticizers, fungistatic and may also be used according to the present invention.

Other examples of surface active additives, foam stabilizers, cell regulators, stabilizers, flame retarding substances, plasticizers, dyes, fillers and fungistatic and bacteriostatic substances which may be used according to the present invention and details concerning the use and action of these additives are known and may be found in Kunststoff-Handbuch, Volume VI, published by Vieweg and Hochtlen, Carl Hanser-Verlag, Munich, 1966, pages 103 to 113.

The quantity of polyisocyanate (Component (i)) used in the process according to the present invention is preferably calculated so that the foamable mixture has an isocyanate index of from 70 to 130, in particular from 90 to 110. By "isocyanate index" is meant the quotient of the number of isocyanate groups and number of groups which are reactive with isocyanates multiplied by 100.

The known reaction injection molding technique (RIM process) is used for carrying out the process according to the present invention. In general, Components (i), (ii), and (iii) may be mixed simultaneously, or the non-reactive components may be pre-mixed and then mixed with the reactive components.

A starting temperature of from 10° to 50° C., preferably from 20° to 30° C., is chosen for the mixture introduced into the mold. The temperature of the mold itself is generally from 40° to 100° C., and preferably from 50° to 70° C.

Although the very rapid reaction between the components may render the use of mold release agents unnecessary, e.g. for removal of the molded product from polished metal molds, the known mold release agents based on wax or silicone may be used if desired. Furthermore, when carrying out the process according to the present invention, the internal mold release agents known in the art, such as those described, for example, in German Offenlegungsschriften Nos. 1,953,637 and 2,121,670, may also be used.

The moldings obtainable by the process according to the present invention are particularly suitable for the manufacture of flexible car bumpers and car body elements. However, with suitable variation of the starting components and particularly if a relatively low proportion of the active diamine is used, it is also possible to produce materials which have good abrasion resistance and high mechanical strength e.g. flexible polyurethane shoe soles.

The invention is further illustrated, but is not intended to be limited by the following examples in which all parts and percentages are by weight unless otherwise specified.

EXAMPLES

EXAMPLE 1

100 parts by weight of a polyether prepared from glycerin, propylene oxide and ethylene oxide, having an OH number of 28.

21.5 parts by weight of a mixture of 65 parts by weight of 1-methyl-3,5-diethylphenylene-2,4-diamine and 35 parts by weight of 1-methyl-3,5-diethylphenylene-2,6-diamine, less than 0.1 part by weight of water, and 0.1 part by weight of a complex of 1 mol of dibutyl tin dilaurate and 1 mol of 2,3-dimethyl-3,4,5,6-tetrahydropyridine were combined to form a polyol blend. The isocyanate used in this example was a reaction product of tripropylene glycol and 4,4'-diphenylmethane diisocyanate (23% by weight NCO).

The mold used was a Monza 2+2 front facia, production caliber, nickel-plated steel mold. Its dimensions were about 8'×4'×4'. The polyol blend and isocyanate were metered using a commercial HK 1000 RIM metering unit and were mixed in a commercial direct impingement KRAUSS-MAFFEI mixhead in a weight ratio of isocyanate to blend of about 50 parts isocyanate per 100 parts of blend.

The isocyanate was maintained at a temperature of 90° F. and the blend was maintained at 85° F. The temperature of the mold was kept at 135° F. and the mold residence time was 30 seconds. As hereafter set forth, the polyol density was monitored and controlled at each loading level of nitrogen. The density was measured using a commercial piece of equipment known as a DYNATROL, whose output responds to changes in the specific gravity of a liquid stream.

In a first experiment, the gas loading in the blend was adjusted until a DYNATROL reading of 1 volt was obtained (corresponding to a minimum density of the blend of 0.65 g/cc at atmospheric pressure). When the blend and isocyanate were metered and mixed as noted above at a shot time of 2.38 seconds a part was obtained having numerous surface defects (having a minimum specific gravity of 1.04)

In a second experiment using the same throughput, (about 3 lbs./sec.), shot time, temperatures and DYNATROL reading but with 0.3 parts of a commercial 25 millimicron particle size carbon black (available from Monochem Corporation) added to the blend for every 100 parts by weight of blend, a part was obtained having a specific gravity of about 1.01. No surface defects were detectable. From this experiment, it was concluded that the addition of carbon black allowed for filling of the mold with the resultant product having a lower specific gravity and without surface defects.

EXAMPLE 2

The second experiment of Example 1 was repeated but using a DYNATROL reading of 0.2 volts (i.e., a larger quantity of gas was used). Again, the resultant part had no observable surface defects.

In order to fairly assess the use of the carbon black in a commercial production, this experiment using the 0.2 volt DYNATROL reading was repeated 10 times continuously. After each shot, the part formed was removed and the mold surface was coated with a commercially available release agent (CHEMTREND XMR-252, a stearate in an isopropanol/water mixture). There was no buffing of the mold between each loading. Even after the 10th part was made, no surface defects were observed. Without carbon black, this was not possible under the same molding conditions since the intensity of surface defects increased after a few successive shot/spray operations.

EXAMPLE 3

In this example, the polyol, active amine and isocyanate used were identical to those used in Example 1 but they were used in amounts corresponding to 82 parts, 18 parts and 47 parts, respectively. The catalysts used were 0.33 parts of triethylene diamine and 0.01 part of dibutyl tin dilaurate. The mold used was in the shape of a PINTO front headlamp part and was a nickel plated steel having the approximate dimensions: 4'×3'×2'.

A DYNATROL reading of the blend corresponding to a specific gravity of 0.977 at 50 psi was selected. The same metering and mixing equipment was used as in Example 1. After a shot time of 1.15 seconds at a throughput of 3 lbs/sec. a part was produced, having non-uniform densities, particularly in the areas farthest from the point where the mixture entered the mold. Incomplete filling was observed at the points farthest from the point at which the mixture entered the mold.

Using the same conditions, but with the addition of 0.1 part of a commercial carbon black (SPEZIAL BLACK 4-DEGUSSA) at the same DYNATROL reading, it was possible to obtain a full part with uniform density after a shot time of only 1.10 seconds at the identical throughput of 3 lbs./sec., which would amount to material savings in excess of 5%.

EXAMPLES 4 THROUGH 19

In order to test the ability of a variety of different inorganic nitrogen adsorbing agents, the following tests were conducted. In each instance, 180 parts of the blend of Example 1 was placed in a closed vessel and kept at a temperature of 25° C. Nitrogen was introduced into the system and the vessel was maintained at a pressure of 75 psi. As soon as the pressure was applied, the vessel containing the blend was agitated for a period of 10 minutes. The pressure was then released and vessel was opened. Its contents were immediately poured into a second vessel provided with a hydrometer to measure the specific gravity of the liquid. A reading of the specific gravity was taken every 30 seconds for 8 minutes. In each instance, the amount of additive used was 0.5 parts per 100 parts of blend.

In each case, the hydrometer reading decreased as a function of time, corresponding to the change of the gas from the dissolved state to the dispersed state in the polyol liquid. The initial density of the system in which essentially all gas was in the dissolved state in each case was 1.021 g/cc which is identical to the polyol liquid density at 25° C. without any gas. That is, the effect of dissolved gas on polyol specific gravity is negligible. Dispersed gas will, of course, reduce specific gravity of the liquid.

The hydrometer reading vs. time for the base polyol was compared with the same response for each of the additives, by computing the change in specific gravity with time from an assumed initial volume of 1.021 g/cc, to the value at 3 minute as follows:

$$\text{rate} = \frac{1.021 - SG \text{ 3 min.}}{3 \text{ min.}} = \frac{\Delta SG}{\Delta t},$$

where $\delta_3$ min. = the specific gravity after 3 minutes. It should be noted that all of the experiments, the specific gravity change over the first three minutes represented most of the total change. This rate for the polyol with additive was then compared with the base polyol to arrive at a % increase in rate of specific gravity change as follows:

$$\% \text{ increase in rate} = \frac{\text{rate} - \text{rate standard}}{\text{rate standard}}$$

where rate standard = rate without additive The higher the % increase in rate of change of specific gravity, the more effective the additive was in increasing blowing agent efficiency. The results are as set forth in Table 1.

In Table 1, the following additives were used:

CHARCOAL PWA—available from Pittsburgh Activated Carbon:
Particle size 65–75% minus 325 mesh
Total surface area: 1000–1100 $m^2/g$ ($N_2$ BET Method).

CHARCOAL BPL: Available from Pittsburgh Activated Carbon
Total surface area: 1050–1150 $m^2/g$
Apparent density (bulk density, dense packing) g/cc = 0.48
Real density (He displacement) g/cc = 2.1.

CHARCOAL PCB: Available from Pittsburgh Activated Carbon
Total surface area: 1150–1250 $m^2/g$
Apparent density = 0.44 g/cc
Real density = 2.2 g/cc.

CHARCOAL RB: Available from Pittsburgh Activated Carbon
Total surface area: 1150–1350 $m^2/g$
Apparent density g/cc = 0.41
Real density g/cc = 2.35
Particle size: 65–75% microns 325 mesh.

BAYFERROX 130 RED: A red iron oxide available from Moblay Chemical Corporation, having a predominant particle size of 0.17 microns and a residue on a 325 ASTM mesh screen of 0.05%, with an $Fe_2O_3$ content of 95–97%.

BAYFERROX 130 M RED: Same as 130 red but having a residue on a 325 ASTM mesh screen of less than 0.001%, with an $Fe_2O_3$ content of 95–97%.

BAYFERROX 180 M RED: A red iron oxide available from Mobay Chemical Corporation, having a predominant particle size of 0.70 microns and a residue on a 325 ASTM mesh screen of less than 0.001%, with an $Fe_2O_3$ content of 96.97%.

BAYFERROX 110 M RED: A red iron oxide available from Mobay Chemical Corporation, having a predominant particle size of 0.09 microns and a residue on a 325 ASTM mesh screen of less than 0.001%, with an $Fe_2O_3$ content of 94–96%.

BAYFERROX 318 BLACK: A black iron oxide available from Moblay Chemical Corporation, having a predominant particle size of 0.2 microns, a residue on a 325 ASTM mesh screen of 0.1%, and an $Fe_2O_3$ content of 93–95%.

BAYFERROX 420 YELLOW: A yellow iron oxide available from Mobay, having a predominant particle size of 0.1×0.7 microns, a residue on a 325 ASTM mesh screen of 0.05%, and an $Fe_2O_3$ content of 86–87%.

BAYFERROX 910 YELLOW: A yellow iron oxide available from Mobay, having a predominant particle size of 0.1×0.6 microns, a residue on a 325 ASTM mesh of 0.039 and an $Fe_2O_3$ content of 85–87%.

DEGUSSA: A carbon black available from DeGussa having a 325 ASTM mesh residue of 0.05%, an average particle size of 25 millimicrons, and a surface area (BET method) of 180 $m^2/g$.

SYLOID 244: A silica available from Davison Chemical Division of Grace Industrial Chemicals having a surface area of 310 $m^2g$, an average particle size of 4 microns and a density of 7 lbs./$ft.^3$.

SYLOSIL 120: A crystalline sodium aluminosilicate zeolite powder available from Davison Chem. having an average particle size of 2–3 microns and a bulk density of 30 lbs./$ft.^3$.

MISTRON VAPOR: A talc powder available from Cyprus Industrial Minerals Co., having an average particle size of 1½ microns.

TABLE 1

|  | specific gravity at 3 min. | $\frac{\Delta SG}{\Delta t}$ | % increase in rate of change of specific gravity |
|---|---|---|---|
| Standard | .933 | .0293 | — |
| Charcoal PWA | .775 | .0820 | 179.9 |
| Charcoal BPL | .797 | .0747 | 154.9 |
| Charcoal PCB | .835 | .0620 | 111.6 |
| Charcoal RB | .828 | .0643 | 119.6 |
| Iron Oxide 130 Red | .818 | .0676 | 130.9 |
| Iron Oxide 130 m Red | .844 | .0590 | 101.4 |
| Iron Oxide 180 m Red | .910 | .0370 | 26.3 |
| Iron Oxide 110 m Red | .905 | .0307 | 32.1 |
| Iron Oxide 910 Yellow | .870 | .0503 | 71.8 |
| Iron Oxide 420 Yellow | .917 | .0347 | 18.4 |
| Iron Oxide 318 Black | .924 | .0323 | 10.3 |
| DeGussa | .903 | .0393 | 34.1 |
| Syloid 244 | .870 | .0503 | 71.8 |
| Sylosil 120 | .868 | .0510 | 74.1 |
| Mistron Vapor | .909 | .0373 | 27.3 |

What is claimed is:

1. A process for the production of Microcellular elastomeric moldings comprising:
   (A) introducing a reaction mixture into a closed mold, said reaction mixture comprising:
      (i) an organic polyisocyanate,
      (ii) a hydroxyl group containing compound having a molecular weight of from 1800 to 12,000,
      (iii) a catalyst for the reaction between hydroxyl groups and isocyanate groups,
      (iv) an active aromatic diamine having at least one alkyl substituent in the orthoposition to a first amino group and two alkyl substituents in orthoposition to a second group, and
      (v) air and/or nitrogen dissolved under pressure in any one or more of Components (i), (ii), (iii) or (iv),
   (B) allowing said reaction mixture to react in said mold and
   (C) removing the resultant product from said mold, the improvement wherein in any of Components (i), (ii), (iii) or (iv) which does contain said air and/or nitrogen dissolved therein there is included an inorganic, finely divided, nitrogen adsorbing agent in an amount sufficient to accelerate the transition of the air and/or nitrogen from the dissolved state to the dispersed state upon release of the pressure.

2. The process of claim 1 wherein said adsorbing agent is selected from the group consisting of aluminas, silicas, carbons, and iron oxides.

3. The process of claim 1 wherein said adsorbing agent has a surface area of more than 10 m²/g.

4. The process of claim 1 wherein said adsorbing agent is used in an amount of from 0.01 to 1% by weight based on the amount of Component (ii).

5. The process of claim 4 wherein said adsorbing agent is used in an amount of from 0.1 to 0.7% by weight based on the amount of Component (ii).

6. The process of claim 5, wherein said adsorbing agent is used in an amount of from about 0.5% without any range.

7. The process of claim 4 wherein said Component (iv) is used in an amount of from 5 to 75% by weight based on the amount of Component (ii).

8. The process of claim 7 wherein said Component (iv) is used in an amount of from 5 to 35% by weight based on the amount of Component (ii).

9. The process of claim 8 wherein said Component (iv) is used in an amount of from 8 to 35% by weight based on the amount of Component (ii).

10. The process of claim 7, wherein the amounts of reactants are chosen and that the mixture has an isocyanate index of from 70 to 130.

11. The process of claim 10, wherein the amounts of reactants are chosen such that the mixture has an isocyanate index of from 90 to 110.

12. The product of the process of claim 1.

13. The product of the process of claim 10.

* * * * *